United States Patent [19]
Bentz et al.

[11] Patent Number: 5,328,777
[45] Date of Patent: Jul. 12, 1994

[54] CATHODE COVER FOR METAL-AIR CELL

[75] Inventors: R. Dennis Bentz; Christopher S. Pedicini, both of Marietta, Ga.

[73] Assignee: AER Energy Resources, Inc., Atlanta, Ga.

[21] Appl. No.: 913,287

[22] Filed: Jul. 14, 1992

[51] Int. Cl.$^5$ .............................................. H01M 12/06
[52] U.S. Cl. ........................................ 429/27; 429/39; 429/48; 429/88
[58] Field of Search ..................... 429/27, 38, 39, 48, 429/82, 88

[56] References Cited

U.S. PATENT DOCUMENTS

| | | | |
|---|---|---|---|
| 3,372,060 | 3/1968 | Platner | 429/39 |
| 3,801,375 | 4/1974 | Jaggard | 136/135 |
| 3,902,922 | 9/1975 | Kalnoki-Kis | 429/82 |
| 3,963,519 | 6/1976 | Louie | 136/86 |
| 4,687,714 | 8/1987 | Oltman et al. | 429/27 |
| 4,822,698 | 4/1989 | Jackovitz | 429/27 |
| 5,069,986 | 12/1991 | Dworkin et al. | 429/27 |
| 5,093,212 | 3/1992 | Lloyd et al. | 429/27 |

FOREIGN PATENT DOCUMENTS 2347791 11/1977 France .

*Primary Examiner*—Stephen Kalafut
*Attorney, Agent, or Firm*—Jones & Askew

[57] ABSTRACT

A cathode cover for a metal-air cell of the type having an air cathode positioned along an external surface of a cell case provides for improved control over exposure of the air cathode to air. The cathode cover allows a sufficient amount of air to the air cathode for an adequate production of power from the cell but limits the amount of air to which the air cathode is exposed so as to prevent premature failure of the cell from flooding, drying out, or contamination. In addition, the cathode cover avoids the problems of point diffusion of oxygen through the air cathode and localized electrolytic reactions. The cathode cover includes a mask member defining a plurality of openings therethrough and forming at least one substantially unobstructed air chamber between the mask member and the air cathode. The mask member includes at least about three of the openings per square inch of the air cathode and the openings provide between about 0.001 and about 0.01 square inches of total open area per square inch of air cathode. In addition, the air chamber has at least about 0.033 cubic inches of unobstructed volume per square inch of the air cathode.

22 Claims, 2 Drawing Sheets

CATHODE COVER FOR METAL-AIR CELL

TECHNICAL FIELD

This invention relates to electrochemical cells, and more particularly to metal-air electrochemical cells.

BACKGROUND OF THE INVENTION

There is an increasing need for light-weight, high-output power supplies for powering the increasing supply of portable electronic equipment such as personal computers. Electrochemical cells are commonly used as power supplies for a variety of applications but are often impractical for use with portable electronic equipment because the electrical energy densities of the electrochemical cells are too low. In other words, conventional electrochemical cells that produce the desired power output are often too heavy for use with portable equipment.

One electrochemical cell that is an exception is the metal-air cell. Metal-air cells have a relatively high energy density because the cathode of a metal-air cell utilizes oxygen from ambient air as a reactant in the electrochemical reaction rather than a heavier material such as a metal or metallic composition. This results in a relatively light-weight power supply.

Metal-air cells include an air-permeable cathode and a metallic anode surrounded by an aqueous electrolyte. Metal-air cells function through the reduction of oxygen which reacts with a metal to form an electric current. Typically, the oxygen is taken from the ambient air. For example, in a zinc-air cell, the anode contains zinc, and during operation, oxygen from the ambient air is converted at the cathode to hydroxide, zinc is oxidized at the anode by the hydroxide, and water and electrons are released to provide electrical energy.

Cells that are useful for only a single discharge cycle are called primary cells, and cells that are rechargeable and useful for multiple discharge cycles are called secondary cells. Both primary and secondary metal-air cells have been developed. An electrically rechargeable metal-air cell is recharged by applying voltage between the anode and cathode of the cell and reversing the electrochemical reaction. Oxygen is discharged to the atmosphere through the air-permeable cathode.

One problem with metal-air cells is that the difference between the ambient relative humidity and the internal relative humidity of the cell can cause the metal-air cell to fail. Equilibrium vapor pressure of the metal-air cell results in an equilibrium relative humidity that is typically about 45 percent. If ambient humidity is greater than the equilibrium relative humidity value for the metal-air cell, the metal-air cell will absorb water from the air through the cathode and fail due to a condition called flooding. Flooding may cause the cell to leak. If the ambient humidity is less than the equilibrium relative humidity value for the metal-air cell, the cell will release water vapor from the electrolyte through the air cathode and fail due to drying out. In most environments where a metal-air battery cell is used, failure occurs from drying out.

During operation of a metal-air cell, the electrolytic reaction produces heat and increases the temperature of the cell. The heat produced by the electrolytic reaction increases the rate of vaporization of the water contained in the cell and can increase the rate at which the cell dries out.

Drying out and flooding are even greater problems for secondary metal-air cells than for primary metal-air cells. Although ambient humidity may not be a sufficient problem to flood or dry out a cell after a single cycle, cumulative water gain or loss from a series of discharge and charge cycles can cause premature failure of a secondary metal-air cell. Another problem with metal-air cells is that contaminants in the air such as carbon dioxide, smoke, and sulfides, decrease the battery output. For example, carbon dioxide reacts with the metal-hydroxide in the electrolyte. The reaction between carbon dioxide and the metal hydroxide forms a metal carbonate compound that interferes with the electrochemical reaction.

Thus, it has been desirable to control the exposure of the air cathode in a metal-air cell to air so that the amount of air to which the cathode is exposed is sufficient to generate the power demands on the cell but insufficient to cause premature failure of the cell through flooding, drying out, or the accumulation of contaminants. It has been desirable to limit the amount of air over the cathode to an amount approaching the stoichiometric requirements required by the cell to produce the desired power output.

One method for controlling the exposure of an air cathode to air is disclosed in U.S. Pat. No. 4,118,544 which discloses a primary metal-air cell for powering a device such as a hearing aid. The metal-air cell disclosed in U.S. Pat. No. 4,118,544 discloses a metal-air cell having a thin layer of microporous material sandwiched tightly between a perforated cover and an air cathode. The perforations or apertures in the cover control the exposure of the air cathode to air to limit access of the air cathode to excessive moisture and carbon dioxide. Although such an arrangement is effective to limit the exposure of the air cathode to moisture and carbon dioxide, the exposure of the air cathode to air would be too restrictive if such an arrangement were applied to a larger, more powerful metal-air cell and result in inefficient use of the air cathode. In addition, in such an arrangement or an arrangement where the cathode cover is directly against the cathode, the oxygen from the ambient air tends to diffuse through the air cathode at the points of the apertures and create localized reactions. As a result, the oxygen does not react at areas between the apertures of the air cathode cover and the output of the cell is limited.

Another approach to controlling the exposure of metal-air cell cathodes to air is through the use of an air manager system. In an air manager system, a fan supplies air through a system of sized openings and plenums in a housing containing an array of metal-air cells. The exposure of the air cathodes of the cells to air is controlled by the rate of delivery of air by the fan and the sizes of the plenums and openings in the housing. Such arrangements have been effective; however, they have been costly to produce because of the necessity of air-tight seals and appropriate part tolerances to deliver the appropriate amount of air to the metal-air cells.

Therefore, there is a need for an effective, economical means for controlling the exposure of air cathodes in metal-air cells to air to provide a longer useful life for metal-air cells.

SUMMARY OF THE INVENTION

The present invention solves the above-described problems in the prior art by providing an improved cathode cover for metal-air cells which have an air cathode positioned along an external surface of a cell case. Generally described, the cathode cover of the present invention includes a mask member defining a plurality of openings through the mask member and forming at least one substantially unobstructed air chamber between the mask member and the air cathode. The openings in the mask member are sized and arranged to control the exposure of the air cathode to air. More particularly, openings in the mask member are sized and arranged to allow a sufficient amount of air into the air chamber for the cell to produce an adequate amount of power, but not to flood or dry out the cell, or overexpose the cell to contaminants, and thereby cause the cell to fail.

Even more particularly, the cathode cover of the present invention includes a wall means extending from the mask member to the case for positioning the mask member at a distance spaced apart from the air cathode so as to form the air chamber between the mask member and the air cathode. The mask member includes at least about three of the openings per square inch of the air cathode. Such openings provide between about 0.001 and about 0.01 square inches of total open area per square inch of the air cathode and the air chamber has at least about 0.033 cubic inches of unobstructed volume per square inch of the air cathode.

More particularly, the mask member preferably includes from about 3 to about 20 of the openings per square inch of the air cathode. Even more preferably, the mask member includes from about 8 to about 15 of the openings per square inch of the air cathode. Furthermore, the air chamber preferably has a volume from about 0.033 to about 0.06 cubic inches per square inch of the air cathode. Furthermore, the openings in the mask member preferably provide between about 0.004 and about 0.008 square inches of total open area per square inch of the air cathode.

The cathode cover of the present invention may further comprise a plurality of discrete, unobstructed air chambers extending across substantially the entire air cathode and having at least about 0.033 cubic inches of unobstructed volume per square inch of the air cathode. Furthermore, the wall means of the cathode cover of the present invention may further comprise a grid extending from the mask member to the air cathode for maintaining the distance between the mask member and the air cathode. The grid separates the air chamber into the plurality of discrete, unobstructed chambers.

The size, number, and arrangement of openings in the mask member of the present invention in combination with the substantially unobstructed air chamber or chambers formed by the mask member (1) avoid point diffusion of oxygen through the air cathode and provides for maximum diffusion of oxygen through the air chamber and across the surface of the air cathode for full and efficient use of the air cathode, (2) provide a sufficient amount of air for adequate power production from the associated metal-air cell, and (3) limit the total amount of air to which the air cathode is exposed to minimize exposure of the air cathode to moisture and contaminants to prevent premature failure of the cell. More particularly, the cathode cover of the present invention provides a sufficient amount of air for the associated metal-air cell to produce current spikes required by some electrical devices without reduction of the operating voltage of the cell.

Accordingly, an object of the present invention is to provide more efficient production of power from metal-air cells.

Another object of the present invention is to provide a longer useful life for metal-air cells.

A further object of the present invention is to provide for improved control of air in a metal-air cell.

Still another object of the present invention is to provide a structurally simple and economical means for controlling air in a metal-air cell.

Other objects, features and advantages of the present invention will become apparent from the following detailed description, drawings, and claims.

DETAILED DESCRIPTION

Figure 1:
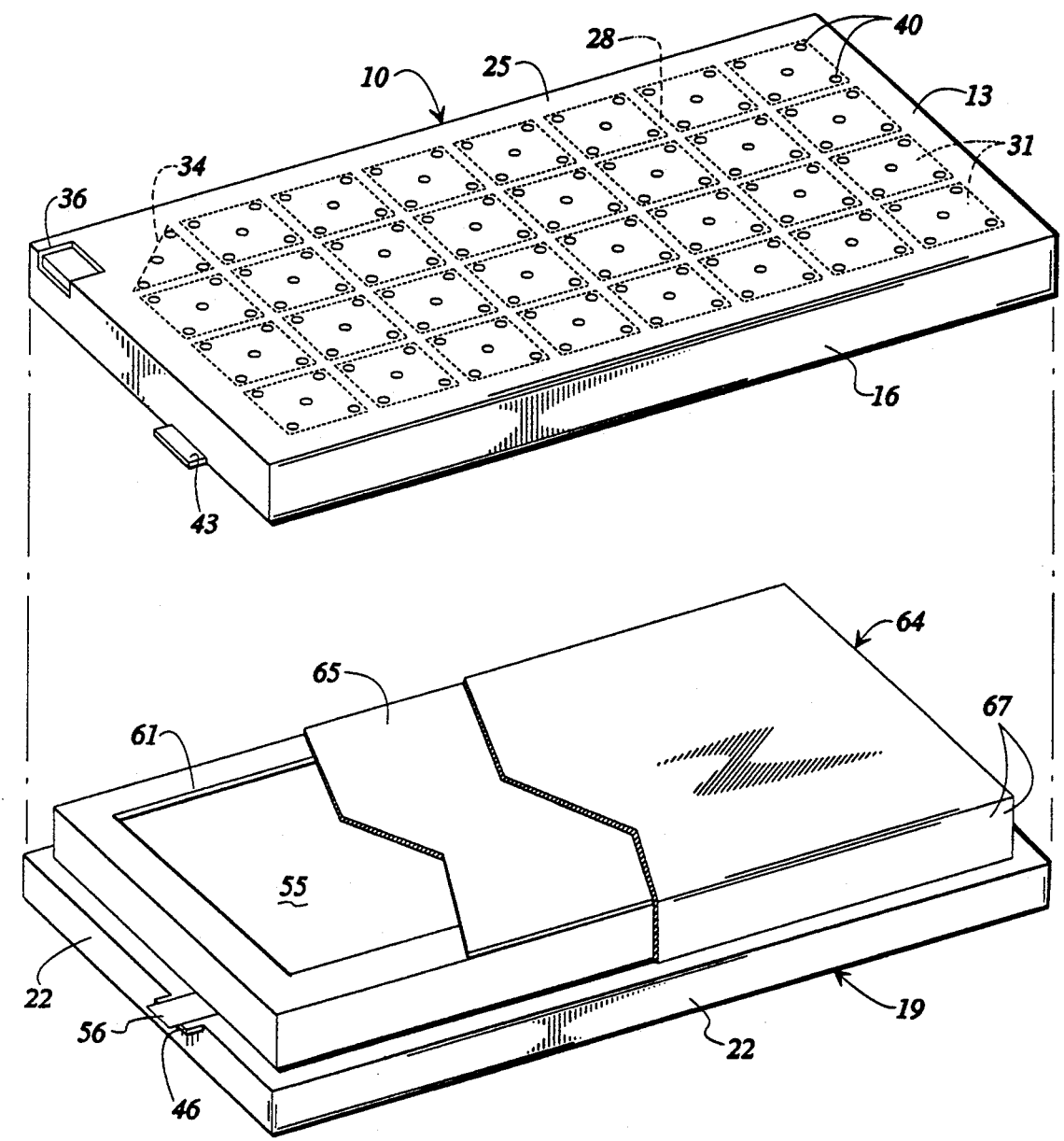
FIG. 1 is an exploded perspective view of a preferred embodiment of an air cathode cover of the present invention and an associated metal-air cell. Portions of the metal-air cell are broken away for illustration.

Turning to FIG. 1, a preferred embodiment 10 of an air cathode cover of the present invention is shown. The cover 10 includes a rectangular mask member 13 and a wall extending from the peripheral edges of the mask member to form an elongated tray-shaped structure. The cover 10 fits over and is fixed to a metal-air cell 19. The wall 16 of the mask member 13 extends from the mask member to a case 22 which houses the components of the metal-air cell 19. As will be explained further below, the mask member 13 controls the amount of air to which the internal components of the metal-air cell 19 are exposed.

The mask member 13 includes a planar exterior surface 25 and a grid 28 which extends from the mask member towards the internal components of the metal-air cell 19. The grid 28 includes a plurality of spaced walls which extend across the mask member to form, along with the wall 16, an array of rectangular, discrete, unobstructed air chambers 31. One of the air chambers 34 proximate a cathode lead outlet opening 36 is rectangular to allow for the cathode lead outlet opening. The air chambers 31 and 34 extend across substantially the entire air cathode 64 of the cell 19. The walls of the grid 28 cover only a relatively small portion of the air cathode.

Air flows into the mask member 13 through a plurality of openings 40 through the mask member. The openings 40 are substantially evenly distributed across the planar exterior surface 25 of the mask member 13. Preferred ranges of the number and size of the openings 40 and the total open area created by the openings are set forth below. In the embodiment shown in FIG. 1, the openings 40 are arranged so that there are five openings per rectangular air chamber 31 with one hole in the center of each rectangular chamber and four holes surrounding each central hole to form a square pattern. A protrusion 43 extends from the wall 16 of the mask member 13 to form part of an anode lead outlet on the same side of the mask member as the cathode lead outlet 36.

The mask member 13 is preferably made of a plastic material such as polypropylene which is resistant to corrosion from electrolyte and is easily heat welded. The mask member 13 including the wall 16 and grid 28 is preferably a single, integral piece formed by injection molding polypropylene or another suitable polymer. The openings 40 can be formed by punching holes in the formed mask member 13 with a stamp having a corresponding arrangement of pins for forming the openings. Such injection molding and hole-punching techniques are well known to those skilled in the art and are not discussed here in detail.

Figure 2:
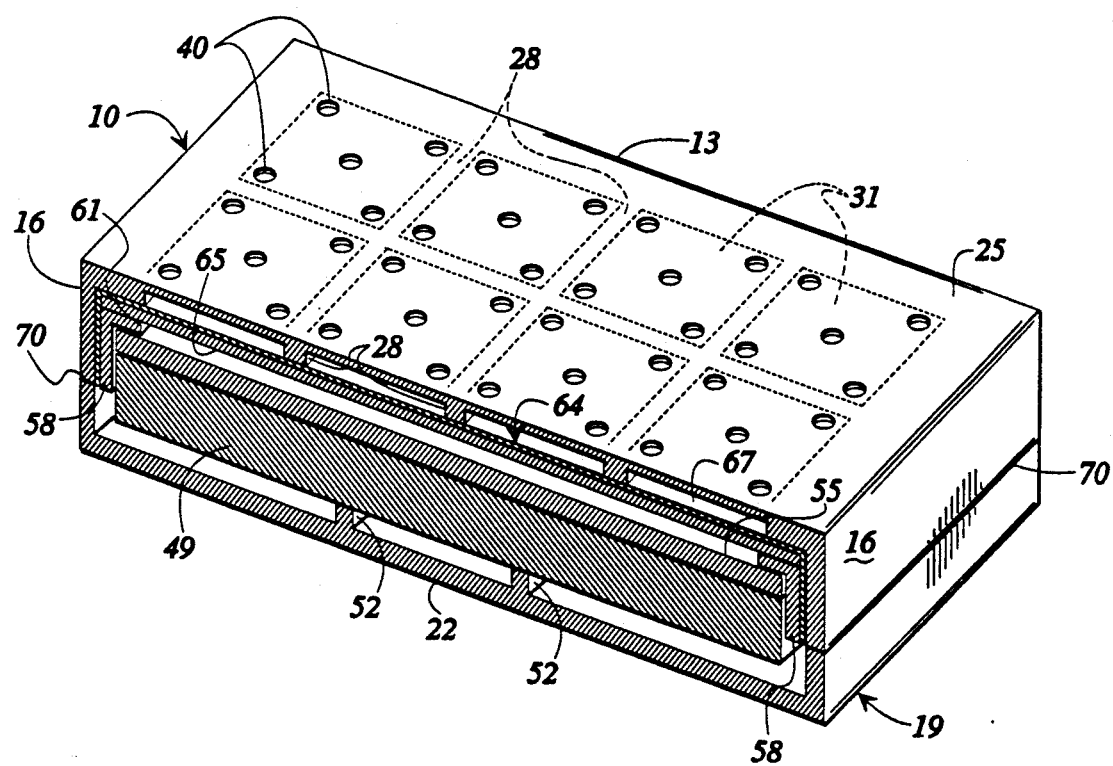
FIG. 2 is a partial perspective view of the air cathode cover and associated metal-air cell shown in FIG. 1.

The cell case 22 is also tray-shaped and has a width and length to match the mask member 13. The cell case 22 includes a protrusion 46 for forming the remainder of the anode lead outlet. The cell case 22 houses the internal components of the metal-air cell 19. Turning to FIG. 2, an anode 49 is shown disposed in the cell case 22 and supported on ribs 52 running the length of the cell case. A separator 55 fits over the side of the anode 49 opposite the cell case 22. A suitable anode is a wrapped, zinc anode such as that disclosed in U.S. Pat. No. 4,957,826, the disclosure of which is expressly incorporated herein by reference. The anode 49 may be wrapped in a sheet of absorbent, wettable, oxidation-resistant, woven or non-woven cloth such as cotton, rayon, modified CMC or wettable plastic fibers. The anode 49 includes a metal current collector screen which has a lead 56 extending therefrom to provide a positive terminal for the cell 19. A suitable separator is also disclosed in U.S. Pat. No. 4,957,826.

A rectangular cathode support 58 fits against the edges of the anode 49 and over a peripheral portion of the separator 55. The cathode support 58 includes a rectangular frame having an L-shaped cross section and defines a rectangular central opening 61. The cathode support 58 fits about the separator 55 and anode 49 like a frame. The central opening 61 of the cathode support 58 leaves the separator 55 exposed to an air cathode 64.

The air cathode 64 includes a cathode sheet 65 covered by a gas-permeable, liquid-impermeable membrane 67 and fits squarely over the rectangular cathode support 58 covering the central opening 61 of the cathode support. Suitable cathodes for use with the present invention include porous sheet-type cathodes. Such cathodes typically include an active layer directly adhered to a gas-permeable, liquid-impermeable, wet-proofing layer as disclosed in U.S. Pat. Nos. 4,354,958; 4,518,705; 4,615,954; 4,927,514; and 4,444,852, the disclosures of which are expressly incorporated herein by reference. With typical sheet-type cathodes, the active layer includes catalyzed particles of activated carbon and particles of a hydrophobic polymer such as polytetrafluoroethylene (Teflon). The wet-proofing layer forms the air side of the cathode and typically includes a mixture of carbon black particles and Teflon particles. Such cathodes also typically include an expanded metal sheet current collector which has a lead extending therefrom (not shown) to provide a negative terminal for the cell.

The gas-permeable, liquid-impermeable membrane 67 fits over the air side of the cathode sheet 65 to form the air cathode 64. The membrane 67 is preferably rectangular and tray-shaped so that the membrane extends over the cathode sheet 64 and the sides of the cathode support 58 to abut the peripheral edge of the cell case 22. A suitable material for the membrane 67 is TYVEK microporous polypropylene membrane available from DuPont of Wilmington, Del. It should be understood, however, that the additional layer of gas-permeable, liquid-impermeable membrane 67 is not necessary to practice the present invention but is preferred for sealing electrolyte within the cell.

Like the mask member 13, the cell case 22 and cathode support 58 are each preferably made by injection molding a plastic material such as polypropylene which is resistant to corrosion from electrolyte and is easily heat welded. Preferably, the mask member 13 is heat welded to the cell case 22 and the peripheral edge of the membrane 67 by heat welding to form a single, integral seal 70 between the mask member 13 and the metal-air cell 19. The heat welding may be performed using a hot plate welding machine available from Forward Technologies, of Minneapolis, Minn.

After heat welding the mask member 13 to the metal-air cell 19, the metal-air cell is filled with electrolyte. A suitable electrolyte is an aqueous base including a group I metal hydroxide such as LiOH, NaOH, KOH, CsOH, or the like, as disclosed in U.S. Pat. No. 4,957,826, the disclosure of which has already been incorporated herein by reference. The electrolyte may be injected into the metal-air cell 19 through the cell case 22 using a syringe. The small hole made by the syringe may then be heat sealed after the electrolyte is added.

During operation of the metal-air cell 19, air enters the air chambers 31 and 34, penetrates the gas-permeable membrane 67 to the cathode sheet 65 where oxygen from the air begins the electrolytic reaction that results in current production from the cell. The size of the air chambers 31 and 34 and the size, number and arrangement of openings 40 in the mask member 13 control the amount of air to which the membrane-covered air cathode 64 is exposed. As explained above, by controlling the exposure of the membrane-covered air cathode 64 to air, the present invention provides for full and efficient use of the air cathode and prolongs the useful life of the metal air cell.

More specifically, the air chambers 31 and 34 are sized so that in combination with the number, size and arrangement of openings 40 in the mask member, the air chambers allow a sufficient amount of air to the cathode 64 for adequate power production from the cell 19 but limit the exposure of the air cathode to air to minimize exposure of the air cathode to moisture and contaminants to prevent premature failure of the cell from flooding, drying out, or contamination. The air chambers 31 and 34 are formed by the mask member 13 and the membrane-covered air cathode 64. The wall 16 and grid 28 of the mask member 13 position the mask member at a distance spaced apart from the membrane-covered air cathode 64 to form the air chambers 31 and 34 between the mask member and the membrane-covered air cathode. The air chambers 31 and 34 are substantially unobstructed between the mask member 13 and the membrane-covered air cathode 64. The grid 28 of the mask member 13 extends from the planar exterior surface 25 of the mask member to the membrane-covered air cathode 64 and maintains the distance between the mask member and the air cathode. Because the air chambers 31 and 34 are substantially unobstructed, the air entering the air chambers through the openings 40 and the mask member 13 disperses substantially evenly across the surface of the membrane-covered air cathode 64 for full and efficient use of the air cathode. The diffusion of oxygen across the surface of the membrane-covered air cathode 64 avoids point diffusion of oxygen through the air cathode and localized electrolytic reactions which can occur with metal-air cells wherein the cathode cover does not form a substantially unobstructed air chamber between the cover and the air cathode.

Preferably, the mask member 13 is maintained at a distance spaced apart from the membrane-covered air cathode 64 so that the air chambers 31 and 34 have at least about 0.033 cubic inches of unobstructed volume per square inch of air cathode. An air chamber having an unobstructed volume substantially less than 0.033 cubic inches per square inch of cathode does not provide for an adequate air supply for the air cathode and does not allow for effective dispersion of oxygen across the surface of the air cathode and results in inefficient use of the air cathode. The air chambers 31 and 34 preferably have an unobstructed volume from about 0.033 to about 0.06 cubic inches per square inch of the air cathode. If the air chambers 31 and 34 have a volume substantially greater than 0.06 cubic inches per square inch of air cathode, the air cathode may become overexposed to air and prematurely fail due to flooding, drying out or contamination.

As mentioned above, the exposure of the membrane-covered air cathode 64 to air is also controlled by the number, size and arrangement of the openings 40 in the mask member 13. The openings 40 in the mask member 13 are preferably substantially evenly distributed across the mask member so that the air is substantially evenly distributed across the surface of the membrane-covered air cathode 64. The openings 40 preferably provide between about 0.001 and about 0.01 square inches of total open area per square inch of the membrane covered air cathode 64. If the openings 40 provide substantially less than about 0.001 square inches of total open area per square inch of the membrane-covered air cathode 64, the membrane-covered air cathode is not exposed to an adequate amount of oxygen for adequate current production of the cell and would not allow for sufficient distribution of the oxygen across the surface of the membrane-covered air cathode. With a total open area of less than 0.001 square inches per square inch of the membrane-covered air cathode 64, point diffusion of oxygen through the air cathode and localized electrolytic reactions would occur. On the other hand, if the openings 40 provides substantially greater than about 0.01 square inches of total open area per square inch of the membrane-covered air cathode 64, the membrane-covered air cathode 64 would be exposed to an excessive amount of air resulting in premature failure of the cell. Even more preferably, the openings 40 provide between about 0.004 and about 0.008 square inches of total open area per square inch of the membrane-covered air cathode 64.

For maximum dispersion of oxygen across the surface of the membrane-covered air cathode 64, the openings 40 in the mask member 13 must not only provide between 0.001 and about 0.01 square inches of total open area per square inch of the membrane-covered air cathode 64, there must also be at least about three of the openings per square inch of the membrane-covered air cathode. With less than about three of the openings 40 per square inch of the membrane-covered air cathode 64, distances between the openings would be too great and localized electrolytic reactions would occur and inefficient use of the air cathode would be made. preferably, the mask member 13 includes from about three to about 20 of the openings 40 per square inch of the membrane-covered air cathode 64. A mask member with greater than about openings per square inch of air cathode is difficult to manufacture, thus impractical. More preferably, the mask member 13 includes from about 8 to about 15 of the openings 40 per square inch of the membrane covered air cathode 64.

The cathode cover 10 provides sufficient air to the membrane-covered air cathode 64 for the metal-air cell 19 to provide current spikes required by some electronic devices without reduction of the operating voltage of the cell. For example, when the metal-air cell 19 is used to power a computer, the computer demands a sudden and increased level of current when the computer is turned on or when a hard drive is turned on. The cathode cover 10 provides sufficient air for the metal-air cell to provide such current spikes.

The preferred embodiment 10 shown in FIGS. 1 and 2 is made for a metal-air cell with an air cathode having an air side area of 14.8 square inches with the capability of delivering 1.25 amps. of current at 1 volt and current spikes of up to about 2.5 for periods from about 100 to about 200 milliseconds at 1 volt. According to that preferred embodiment, the air chambers 31 and 34 have a height of 0.055 inches (the distance between the membrane 67 and the interior side of the mask member 13), a total unobstructed volume of about 0.55 cubic inches and a relative unobstructed volume of 0.037 cubic inches per square inch of cathode, and the mask member has a total of 157 holes each having a diameter of 0.026 inches for a total of open area of 0.0833 square inches, a relative open area of 0.0056 square inches per square inch of cathode, and 10.6 holes per square inche of cathode.

It should be understood that the foregoing relates only to a preferred embodiment of the present invention, and that numerous changes may be made therein without departing from the spirit and scope of the invention as defined by the following claims:

We claim:

1. A cathode cover for a metal-air cell of the type having an air cathode positioned along an external surface of a cell case, comprising:

a mask member defining a plurality of openings therethrough; and wall means extending from the mask member to the case for positioning the mask member at a distance spaced apart from the air cathode so as to form a plurality of discrete, unobstructed air chambers extending between the mask member and the air cathode and across substantially the entire air cathode;

the mask member including at least about 3 of the openings per square inch of the air cathode;

the openings providing between about 0.001 and about 0.01 square inches of total open area per square inch of the air cathode; and the air chambers having at least about 0.033 cubic inches of unobstructed volume per square inch of the air cathode.

2. A cathode cover as in claim 1, wherein the wall means includes a grid extending from the mask member to the air cathode for maintaining the distance between the mask member and the air cathode, the grid separating the air chamber into the plurality of discrete, unobstructed chambers.

3. A cathode cover for a metal-air cell of the type having an air cathode positioned along an external surface of a cell case, comprising:

a mask member defining a plurality of openings therethrough; and wall means extending from the mask member to the case for positioning the mask member at a distance spaced apart from the air cathode so as to form a plurality of discrete, unobstructed air chambers extending between the mask member and the air cathode and across substantially the entire air cathode;

the mask member including at least about 8 of the openings per square inch of the air cathode;

the openings providing between about 0.001 and about 0.01 square inches of total open area per square inch of the air cathode; and the air chambers having at least about 0.033 cubic inches of unobstructed volume per square inch of the air cathode.

4. A cathode cover as in claim 3, wherein the wall means includes a grid extending from the mask member to the air cathode for maintaining the distance between the mask member and the air cathode, the grid separating the air chamber into the plurality of discrete, unobstructed chambers.

5. A cathode cover for a metal-air cell of the type having an air cathode positioned along an external surface of a cell case, comprising:

a mask member defining a plurality of openings therethrough; and wall means extending from the mask member to the case for positioning the mask member at a distance spaced apart from the air cathode so as to form a plurality of discrete, unobstructed air chambers extending between the mask member and the air cathode and across substantially the entire air cathode;

the mask member including from about 8 to about 15 of the openings per square inch of the air cathode;

the openings providing between about 0.004 and about 0.008 square inches of total open area per square inch of the air cathode; and the air chambers having at least about 0.033 cubic inches of unobstructed volume per square inch of the air cathode.

6. A cathode cover as in claim 5, wherein the wall means includes a grid extending from the mask member to the air cathode for maintaining the distance between the mask member and the air cathode, the grid separating the air chamber into the plurality of discrete, unobstructed chambers.

7. A cathode cover for a metal-air cell of the type having an air cathode positioned along an external surface of a cell case, comprising:

a plastic mask member defining a plurality of openings therethrough; and plastic wall means extending from the mask member to the case for positioning the mask member at a distance spaced apart from the air cathode so as to form at least one substantially unobstructed air chamber between the mask member and the air cathode;

the mask member including at least about 3 of the openings per square inch of the air cathode;

the openings providing between about 0.001 and about 0.01 square inches of total open area per square inch of the air cathode; and the air chamber having at least about 0.033 cubic inches of unobstructed volume per square inch of the air cathode.

8. A cathode cover as in claim 7, wherein the mask member includes from about 3 to about 20 of the openings per square inch of the air cathode.

9. A cathode cover as in claim 7, wherein the air chamber has an unobstructed volume from about 0.033 to about 0.06 cubic inches per square inch of the air cathode.

10. A cathode cover as in claim 7, wherein the mask member includes from about 3 to about 20 of the openings per square inch of the air cathode and the air chamber has an unobstructed volume from about 0.033 to about 0.06 cubic inches per square inch of the air cathode.

11. A cathode cover as in claim 7, further comprising a plurality of discrete, unobstructed air chambers extending across substantially the entire air cathode and having at least about 0.033 cubic inches of unobstructed volume per square inch of the air cathode.

12. A cathode cover as in claim 11, wherein the wall means includes a plastic grid extending from the mask member to the air cathode for maintaining the distance between the mask member and the air cathode, the grid separating the air chamber into the plurality of discrete, unobstructed chambers.

13. A cathode cover for a metal-air cell of the type having an air cathode positioned along an external surface of a cell case, comprising:

a plastic mask member defining a plurality of openings therethrough; and plastic wall means extending from the mask member to the case for positioning the mask member at a distance spaced apart from the air cathode so as to form at least one substantially unobstructed air chamber between the mask member and the air cathode;

the mask member including at least about 8 of the openings per square inch of the air cathode;

the openings providing between about 0.001 and about 0.01 square inches of total open area per square inch of the air cathode; and the air chamber having at least about 0.033 cubic inches of unobstructed volume per square inch of the air cathode.

14. A cathode cover as in claim 13, wherein the mask member includes from about 8 to about 15 of the openings per square inch of the air cathode.

15. A cathode cover as in claim 13, wherein the air chamber has an unobstructed volume from about 0.033 to about 0.06 cubic inches per square inch of the air cathode.

16. A cathode cover as in claim 13, wherein the mask member includes from about 8 to about 15 of the openings per square inch of the air cathode and the air chamber has an unobstructed volume from about 0.033 to about 0.06 cubic inches per square inch of the air cathode.

17. A cathode cover as in claim 13, further comprising a plurality of discrete, unobstructed air chambers extending across substantially the entire air cathode and having at least about 0.033 cubic inches of unobstructed volume per square inch of the air cathode.

18. A cathode cover as in claim 17, wherein the wall means includes a plastic grid extending from the mask member to the air cathode for maintaining the distance between the mask member and the air cathode, the grid separating the air chamber into the plurality of discrete, unobstructed chambers.

19. A cathode cover for a metal-air cell of the type having an air cathode positioned along an external surface of a cell case, comprising:

a plastic mask member defining a plurality of openings therethrough; and plastic wall means extending from the mask member to the case for positioning the mask member at a distance spaced apart from air cathode so as to form at least one substantially unobstructed air chamber between the mask member and the air cathode;

the mask member including from about 8 to about 15 of the openings per square inch of the air cathode;

the openings providing between about 0.004 and about 0.008 square inches of total open area per square inch of the air cathode; and the air chamber having from about 0.033 to about 0.06 cubic inches of unobstructed volume per square inch of the air cathode.

20. A cathode cover as in claim 19, further comprising a plurality of discrete, unobstructed air chambers extending across substantially the entire air cathode and having at least about 0.033 cubic inches of unobstructed volume per square inch of the air cathode.

21. A cathode cover as in claim 20, wherein the wall means includes a plastic grid extending from the mask member to the air cathode for maintaining the distance between the mask member and the air cathode, the grid separating the air chamber into the plurality of discrete, unobstructed chambers.

22. A cathode cover for a metal-air cell of the type having an air cathode positioned along an external surface of a cell case, comprising:

a mask member defining a plurality of openings therethrough; and a grid extending from the mask member to the case for positioning the mask member at a distance spaced apart from the air cathode so as to form a plurality of discrete, unobstructed air chambers extending between the mask member and the air cathode and across substantially the entire air cathode.

* * * * *